E. M. GRUEL.
DIRIGIBLE HEADLIGHT.
APPLICATION FILED JULY 6, 1918.
1,326,052.
Patented Dec. 23, 1919.
2 SHEETS—SHEET 1.
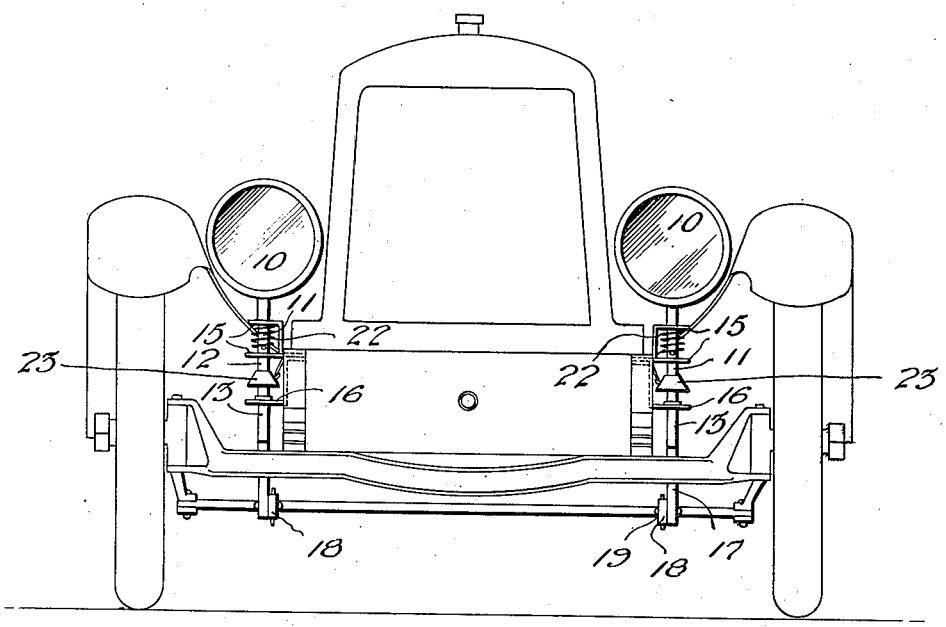
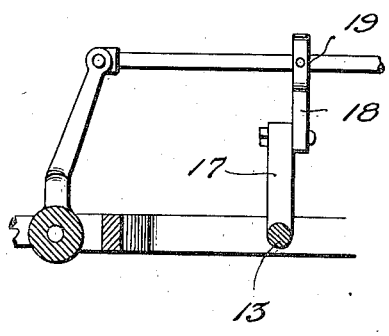
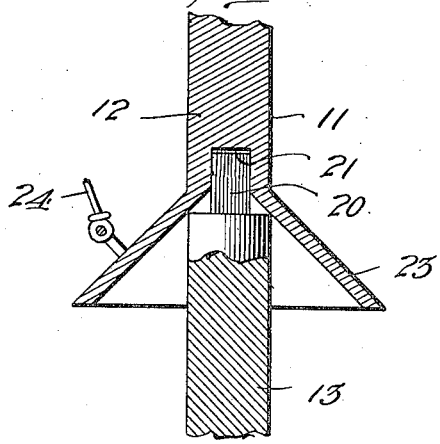
Witnesses:
Inventor
E. M. Gruel.
By Victor J. Evans
Attorney

UNITED STATES PATENT OFFICE.

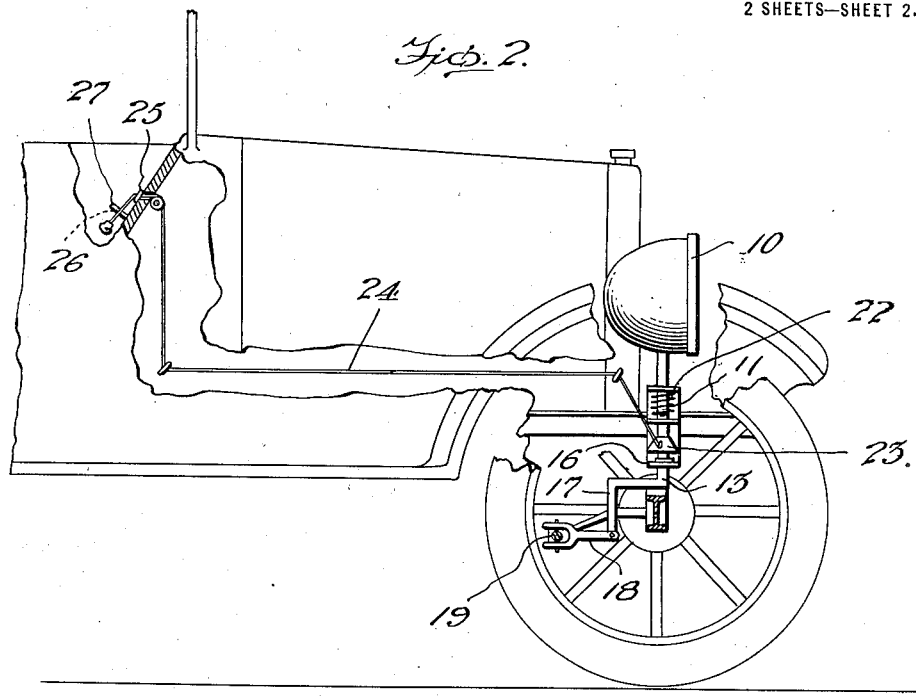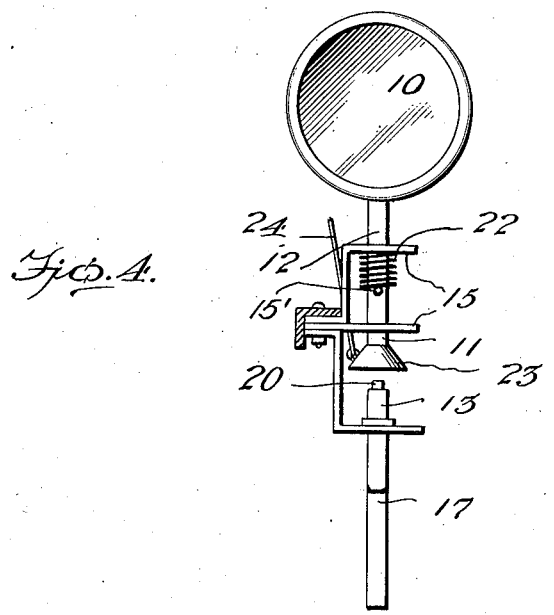

EDGAR M. GRUEL, OF RED LODGE, MONTANA.

DIRIGIBLE HEADLIGHT.

1,326,052.     Specification of Letters Patent.     Patented Dec. 23, 1919.

Application filed July 6, 1918. Serial No. 243,513.

*To all whom it may concern:*

Be it known that I, EDGAR M. GRUEL, a citizen of the United States, residing at Red Lodge, in the county of Carbon and State of Montana, have invented new and useful Improvements in Dirigible Headlights, of which the following is a specification.

This invention relates to vehicle headlights and has for its object to provide a headlight for motor vehicles which may be arranged to turn in the direction of travel of the vehicle or arranged to remain stationary as desired.

With this end in view the invention includes sectional rods upon which the lamp is supported, one section of the rod carrying the lamp, while the other section is connected to a convenient part of the vehicle steering gear, a novel form of coupling being provided for automatically locking the sections of the rod together when desired.

The invention further aims to provide a sectional lamp supporting rod for the above purposes, in which both sections are capable of rotation, while one section is capable of limited vertical movement in order that it may be disconnected from the other section, suitable means located within convenient reach of the driver of the vehicle enabling the driver to connect or disconnect the sections at will.

The invention also includes the following novel construction, combinations and arrangement of parts, to be hereinafter more fully described and illustrated in the accompanying drawings, in which:—

Figure 1 is a front elevation of a motor vehicle equipped with headlights constructed in accordance with the present invention;

Fig. 2 is an elevation of the front part of the vehicle, parts being broken away or shown in section to more clearly illustrate the connection between the steering mechanism and headlights and the flexible element for disconnecting the lamps from the steering mechanism;

Fig. 3 is a horizontal sectional view showing connection between the sectional rod and the steering mechanism;

Fig. 4 is a front elevation of one of the lamps and its associated parts, the lamp carrying section of the supporting rod being disconnected from the other section; and Fig. 5 is a detail vertical sectional view through the rod coupling.

Referring to the drawings in detail the lamp which is shown at 10, is of ordinary or any preferred construction, one of these lamps being mounted upon each side of the vehicle upon sectional supporting rods 11.

The rods 11 include an upper section 12 and a lower section 13, the former being guided in supporting brackets 15, secured to the frame of the vehicle or to any other convenient place.

The section 13 is guided in the bracket 16 carried by the vehicle frame, the lower end of this section having an elbow extension 17. Pivotally connected to the extremity of the extension 17 is one end of the link 18, the opposite end of this link being connected to the connecting rod of the steering knuckle as shown at 19 or to any other appropriate part of the steering mechanism. Through the connection just described, the section 13 of the rod 11 will be caused to rotate when the direction of the vehicle is changed and when this section is connected to the section 12, the lamp 10 will be accordingly turned in the direction of the travel of the vehicle.

For the purpose of connecting the sections 12 and 13 together, a novel form of coupling is provided, which consists of providing the upper end of the section 13 with a squared extremity 20. Formed in the adjacent end of the section 12 is a notch 21, whose shape conforms to the shape of the squared extension and when engaged thereover will cause the two sections to be locked together in a manner to rotate the section 12 when the section 13 is rotated. For the purpose of holding the sections 12 and 13 coupled, the former section is surrounded by a spring 22, one end of which bears against one of the guide and supporting brackets 15, while the opposite end bears against a pin carried by the section 12, so that the said section is forced into engagement with the section 13 through the action of this spring. Carried by the end of the section 12 and located upon diametrically opposite sides thereof are inclined guiding members 23, the width of these members being sufficient to guide the squared extension 20 into the notch 21 to provide for the automatic coupling of the sections when brought together.

In order to disconnect the sections, there is connected to the lower end of the section 12 or to one of the guiding members 23, one end of a flexible element 24, which may be in the form of a wire, the opposite end of this element being located within convenient reach of the driver of the vehicle. When it is desired to disconnect the sections so that the lamps 10 will not turn with the change in the direction of travel of the vehicle, the driver pulls the flexible element 24 sufficiently to disconnect the coupling between the members 12 and 13, a button 25 carried by the element 24 being engaged in the notch 26 of a bracket 27 positioned upon the instrument board of the vehicle. When it is desired that the lamps turn with the change of direction of travel of the vehicle the element 24 is released and the section 12 will move toward the section 13 under the influence of the spring 22, when the two sections will be automatically coupled.

Having described the invention, what is claimed is:—

1. A vehicle headlight embodying a sectional rod mounted for rotary movement, means connecting one section of the rod to the steering gear of the vehicle, a bracket mounted upon the vehicle and receiving the other section of the rod in a manner to permit of vertical and rotary movement, a lamp carried by the last mentioned section, a rectangular stud carried by one end of one of said sections for engagement with a rectangular socket formed in the end of the other section and a flared guide sleeve surrounding the end of the socketed section to guide the stud within the socket and couple the sections together.

2. A vehicle headlight embodying a sectional rod mounted for rotary movement, means connecting one section of the rod to the steering gear of the vehicle, a bracket mounted upon the vehicle and receiving the other section of the rod in a manner to permit of vertical and rotary movement, a lamp carried by the last mentioned section, a rectangular stud carried by one end of one of said sections for engagement with a rectangular socket formed in the end of the other section, a flared guide sleeve surrounding the end of the socketed section to guide the stud within the socket and couple the sections together, means extending within convenient reach of the driver of the vehicle for separating the sectional rod, and a spring surrounding the rod and engageable with the bracket to force the sections of the rod together.

In testimony whereof I affix my signature.

EDGAR M. GRUEL.